United States Patent [19]

Althaus

[11] Patent Number: 5,381,653
[45] Date of Patent: Jan. 17, 1995

[54] AIRCRAFT ENGINE WITH PRESSURE EXCHANGER

[75] Inventor: Rolf Althaus, Flawil, Switzerland

[73] Assignee: Asea Brown Boveri Ltd., Baden, Switzerland

[21] Appl. No.: 162,871

[22] Filed: Dec. 8, 1993

[30] Foreign Application Priority Data

Dec. 10, 1992 [DE] Germany .................. 4241613

[51] Int. Cl.⁶ .............................................. F02C 3/02
[52] U.S. Cl. ........................... 60/39.161; 60/39.45
[58] Field of Search ............ 60/39.02, 39.161, 39.45, 60/226.1

[56] References Cited

U.S. PATENT DOCUMENTS

| | | | |
|---|---|---|---|
| 2,738,123 | 3/1956 | Hussmann | 60/39.45 |
| 3,367,563 | 2/1968 | Hertzberg et al. | 60/39.45 |
| 3,483,697 | 12/1969 | Ruffles et al. | 60/39.45 |
| 3,486,686 | 12/1969 | Williamson | 60/39.45 |
| 4,719,746 | 1/1988 | Keller . | |
| 4,876,849 | 10/1989 | Klingels . | |
| 5,197,276 | 3/1993 | Keller . | |

FOREIGN PATENT DOCUMENTS 503277 9/1992 European Pat. Off. .
458838 8/1968 Switzerland .

*Primary Examiner*—Louis J. Casaregola
*Attorney, Agent, or Firm*—Burns, Doane, Swecker & Mathis

[57] ABSTRACT

In an aircraft engine with a fan or propeller drive, in which at least two shafts (1, 2) disposed to rotate coaxially and independently of one another respectively support a separate compressor (3, 4) and a separate turbine (5, 6), wherein a suitable device for combusting the gases is disposed between the compressor (4) disposed last in the flow direction and the first turbine (6), this device for combusting the gases comprises a dynamic pressure machine (9) known per se that operates with isochoric combustion and has a cellular wheel that rotates between respectively a side part on the air side and a side part on the gas side, both provided with input and output openings, and has a number of cells in which a continuously repeating ignition and combustion process takes place. In addition, a high-pressure turbine (10) is disposed behind the dynamic pressure machine (9) on the same shaft (2) as the following medium-pressure turbine (6).

4 Claims, 3 Drawing Sheets

AIRCRAFT ENGINE WITH PRESSURE EXCHANGER

FIELD OF THE INVENTION

The invention relates to an aircraft engine with a fan or propeller drive, in which at least two shafts disposed to rotate coaxially and independently of one another respectively support a separate compressor and a separate turbine, and a suitable device for combusting the gases is disposed between the compressor disposed last in the flow direction and the first turbine. The invention also relates to a method for operating this aircraft engine.

BACKGROUND OF THE INVENTION

Aircraft engines of this type are known. Aircraft engines with a dual-shaft design have two shafts seated to rotate coaxially and independently of one another, and each has respectively a separate compressor and a separate turbine. The combustion chamber is disposed between the medium-pressure compressor and the medium-pressure turbine, and in turbojet engines, the propulsion jet is disposed downstream of the medium-pressure turbine. In contrast, in aircraft engines with a propeller the propulsive power is essentially generated by means of the transmission of a shaft output to a propeller operating in atmospheric air.

The embodiment of the by-pass flow of dual-flow turbojet engines typically includes the turbofan operating in the by-pass flow and whose blades can either form an extension of the compressor blades (front fan) or the turbine blades (aft fan) of the main rotor, or is driven by a separate rotor. The air flow entering into the engine is guided in a hot primary flow and in a second, cold secondary flow that is essentially independent of the primary flow, and the primary flow is surrounded coaxially and at least partly along its length by the secondary flow in annular or sheath-type fashion. In a bypass engine with a dual-shaft embodiment, this secondary flow is branched off from the primary air flow in a controlled manner and mixed again with the actual propulsion stream in the nozzle.

The primary flow is compressed in the low-pressure compressor and subsequently in the medium-pressure compressor. Afterward, heat energy is supplied to it in the combustion chamber by means of the combustion of continuously injected fuel with the oxygen of the compressed air. Only as much energy is drawn from the compressed and heated air or combustion gas by the downstream turbines as is required to drive the compressors and the turbofan or the propeller.

In comparison to conventional turbojet engines, dual-flow turbojet engines of this type have an increased propulsion effect, an improved ability to be controlled and a reduced specific fuel consumption, particularly at average flying speeds. Thus, any further improvement in the performance of aircraft engines of this type no longer appears to be possible.

Stationary gas turbine systems are known in which a dynamic pressure machine operating with isochoric combustion is disposed between the compressor and the gas turbine. This dynamic pressure machine has a cellular wheel that rotates between respectively a side part on the air side and a side part on the gas side, both provided with input and output openings, and has a number of cells in which a continuously repeating ignition and combustion process takes place. If, during operation, the dynamic pressure machine produces a homogenous fuel distribution in the longitudinal direction of the cells (European Patent Disclosure EP 0468083), problems occur when a low-pressure turbine and a high-pressure turbine are connected to this dynamic pressure machine, because both turbines are to be operated at the same optimum temperature if possible, although the gases are supplied to the high- and low-pressure turbines at different pressures. Therefore a change has been made to generate two partial quantities of gas enriched to different extents with fuel from compressed mass flows that are released from the cells after ignition and compression, wherein the partial quantity enriched to a lesser extent with fuel is supplied to the high-pressure turbine, and the second partial quantity enriched to a greater extent with fuel is supplied to the low-pressure turbine. It has been achieved by means of the different degrees of enrichment of the partial quantities with fuel, that neither overly hot gases are supplied to the high-pressure turbine, nor are overly cold gases supplied to the low-pressure turbine. This results in an improvement in the efficiency of the gas turbine systems.

OBJECT AND SUMMARY OF THE INVENTION

The object of the invention is to use suitable means and develop a method with which it is possible to increase the efficiency and the specific performance of aircraft engines of fan or propeller drive and in which at least two shafts seated to rotate coaxially and independently of one another respectively support a separate compressor and a separate turbine, and wherein a device for combusting the gases is disposed between the last compressor in the flow direction and the first turbine.

This object is attained in accordance with the invention in that a dynamic pressure machine that operates with isochoric combustion is disposed between the last compressor in the flow direction and the first gas turbine, which has a cellular wheel that rotates between respectively a side part on the air side and a side part on the gas side, both provided with input and output openings, and has a number of cells in which a continuously repeating ignition and combustion process takes place, and that a high-pressure turbine is additionally disposed behind the dynamic pressure machine on the same shaft as the following medium-pressure turbine. With the method for operating the aircraft engine, the pressure conditions in either the compressors or in the turbines are adapted.

It is useful when the dynamic pressure machine is disposed in such a way that its rotor free-wheels at a low rpm.

It is also advantageous when the dynamic pressure machine can be driven by a planetary gear.

The advantages of the invention can be seen in, among other things, low-pollutant combustion, an improved efficiency and an improvement in performance as compared with conventional aircraft engines with the same core engine.

Exemplary embodiments of the invention are shown by way of a dual-shaft aircraft engine with axial flow-through.

DETAILED DESCRIPTION OF THE PREFERRED EMBODIMENTS

Only the elements essential for understanding the invention are shown. The flow direction of the working means is indicated by arrows.

Figure 1:
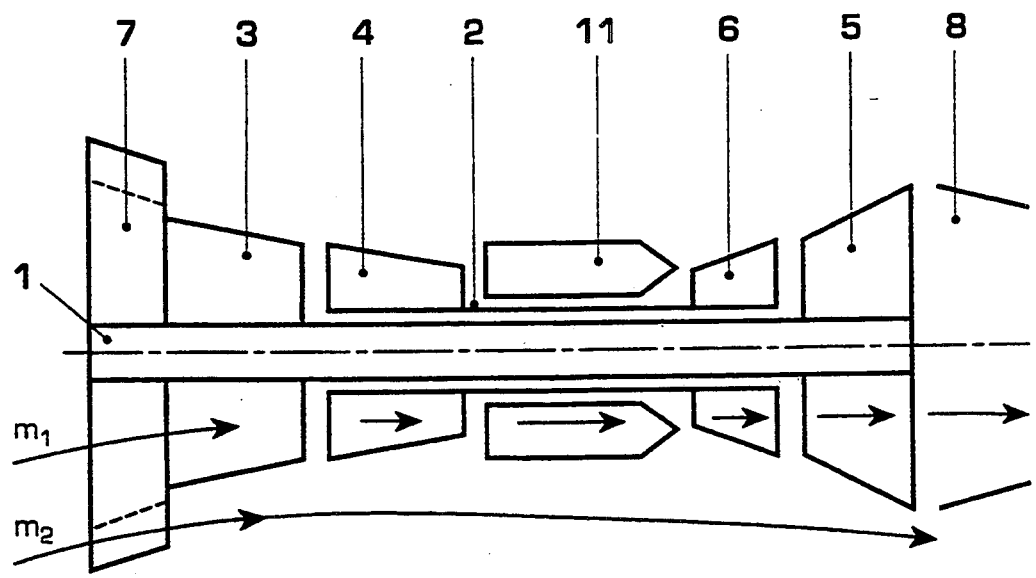
FIG. 1 is the schematic representation of a conventional aircraft engine with a fan.

FIG. 1 shows a conventional aircraft engine of the dual-shaft type with a fan. The low-pressure compressor 3 with a fan 7 and the low-pressure turbine 5 are located on a common shaft 1. The medium-pressure compressor 4 and the medium-pressure turbine 6 are seated on a common shaft 2. Shafts 1 and 2 are seated to rotate coaxially and independently of one another. The combustion chamber 11 is disposed between the medium-pressure compressor 4 and the medium-pressure turbine 6. The propulsion jet 8 is connected to the low-pressure turbine 5.

The air flow entering into the aircraft engine enters a turbofan 7, is compressed slightly, for instance from approximately 1 to approximately 2 bar, and split into a primary air flow with a mass flow $m_1$ and an independent, secondary air current with a mass flow $m_2$. The primary air flow $m_1$ is surrounded coaxially and along its entire length in a sheath-like manner by the secondary flow. The primary air flow is compressed in the compressors 3 and 4 to approximately 6 and approximately 30 bar and conducted into the combustion chamber 11. Heat energy is supplied there by means of the combustion of continuously injected fuel with the oxygen of the compressed air. The medium-pressure turbine 6 (entry pressure approx. 30 bar) disposed in front of the propulsion jet 8 and the low-pressure turbine 5 (entry pressure approx. 10 bar) draw only enough energy out of the air as is needed to drive the medium-pressure compressor 4, the low-pressure compressor 3 and the turbofan 7. The remaining supplied heat energy is utilized for propulsion as kinetic energy of the propulsion stream emitted from the propulsion jet 8.

Figure 2:
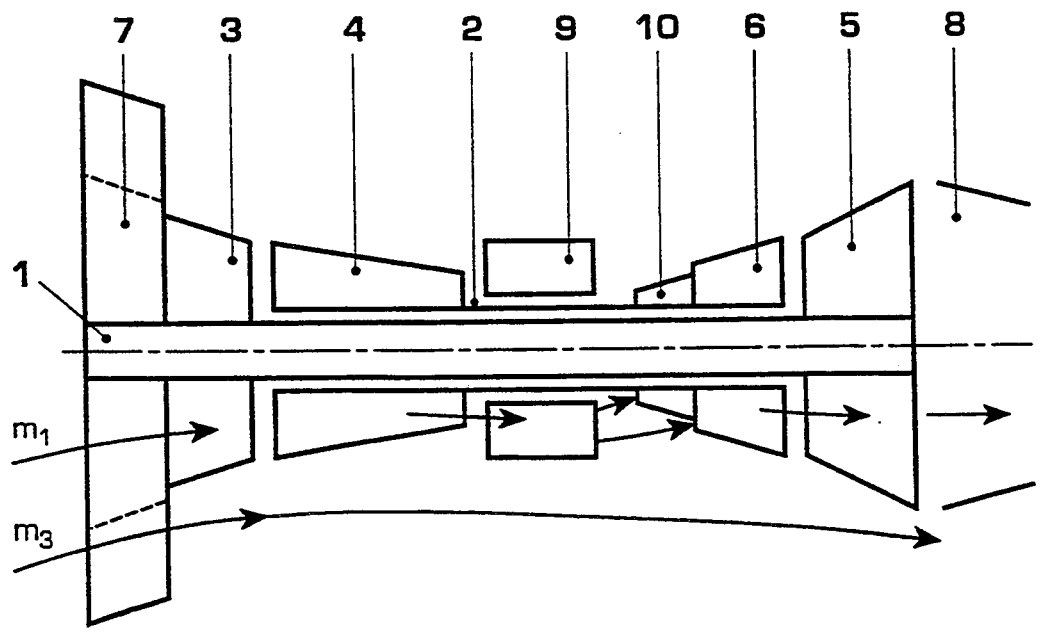
FIG. 2 is the schematic representation of an aircraft engine with fan, a dynamic pressure machine and an additional high-pressure turbine (adaptation of the pressure conditions in the compressors)
Figure 5:
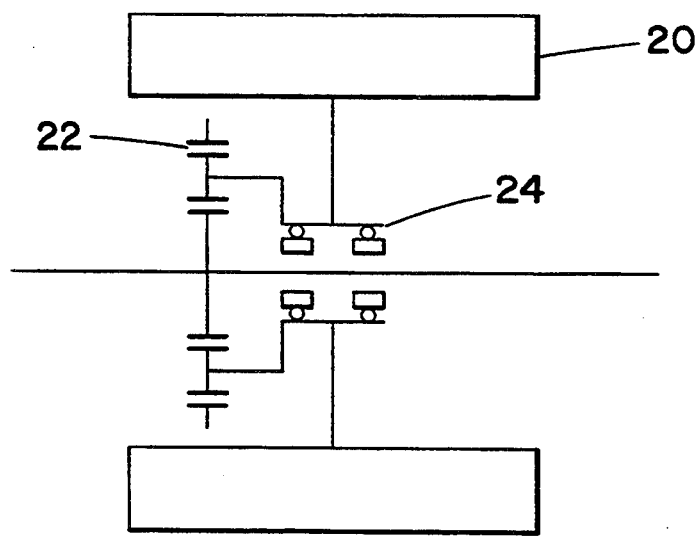
FIG. 5 is a schematic view of a planetary gear system supporting a rotor of the dynamic pressure machine.

An exemplary embodiment of the invention in which the pressure conditions are adapted in the compressors is shown in FIG. 2. It differs from the conventional aircraft engine in FIG. 1 in that a dynamic pressure machine 9 with isochoric combustion is disposed in place of the combustion chamber 11 (FIG. 1). The rotor 20 of the dynamic pressure machine free-wheels, but can also be driven with a planetary gear 22, as illustrated schematically in FIG. 5. For freewheeling, the gear system 22 is omitted, and the bearings 24 alone support the rotor 20 of the dynamic pressure machine. In comparison with FIG. 1, in FIG. 2 a high-pressure turbine 10 is additionally disposed in front of and on the same shaft 2 as the medium-pressure turbine 6. As in the conventional engine in accordance with FIG. 1, the air flow is divided into a primary air flow with a mass flow $m_1$ and a secondary air flow with a mass flow $m_3$. The secondary air flow $m_3$ bypasses the compressors 3, 4, the dynamic pressure machine 9 and the turbines 10, 6 and 5. After flowing through the turbofan 7, the mass flow $m_1$ is compressed in the low-pressure compressor 3 from approximately 2 to approximately 4 bar, for example, then subsequently compressed from approximately 4 to approximately 30 bar in the medium-pressure compressor, and at this pressure reaches the intake opening of the dynamic pressure machine 9. In the dynamic pressure machine 9, the compressed air is enriched with fuel in such a way that three different layers form: the first layer contains no fuel, the second layer contains a small quantity and the third layer contains a large quantity of fuel. The first layer is used as cooling air to cool the walls of the dynamic pressure machine 9 and the high-pressure turbine 10. After combustion of the fuel-air mixture in the cells of the cellular wheel of the dynamic pressure machine 9, The second layer, which was comprised of a lean fuel-air mixture, is supplied to the high-pressure turbine 10 from the dynamic pressure machine 9 through a first outlet opening, while the third layer, which was comprised of the richer fuel-air mixture before combustion, is supplied to the medium-pressure turbine 6 through a second outlet opening. The exact mode of operation of the dynamic pressure machine with isochoric combustion has already been described in Applicant's previous patent applications, so details are omitted here. Through the use of the dynamic pressure machine 9, a portion of the gas is compressed further so that the second layer enters the high-pressure turbine 10 at a pressure of approximately 60 bar, the turbine being additionally disposed, in contrast to the prior art. The third layer is supplied to the medium-pressure turbine 6 at a pressure of approximately 30 bar. The gas expands in the turbines 10 and 6. Thanks to the more extensive enrichment of the third layer with fuel, this layer has the same temperature as the second layer, although the third layer expands more. By means of this, both the high-pressure turbine 10 and the medium-pressure turbine 6 can be operated at the same optimum temperature. The gas subsequently enters the low-pressure turbine 5 at a pressure of approximately 10 bar, and last of all the propulsion jet 8.

In comparison to the prior art, the use of the dynamic pressure machine 9 and the high-pressure turbine 10 results in an improved efficiency and performance in a constant core engine. The bypass ratio $m_3/m_1$ of the engine in accordance with the invention is greater than the bypass ratio $m_2/m_1$ of a comparable conventional aircraft engine, because a larger fan can be driven by the additional capacity, and a larger secondary mass flow $m_3$ can be realized.

Figure 3:
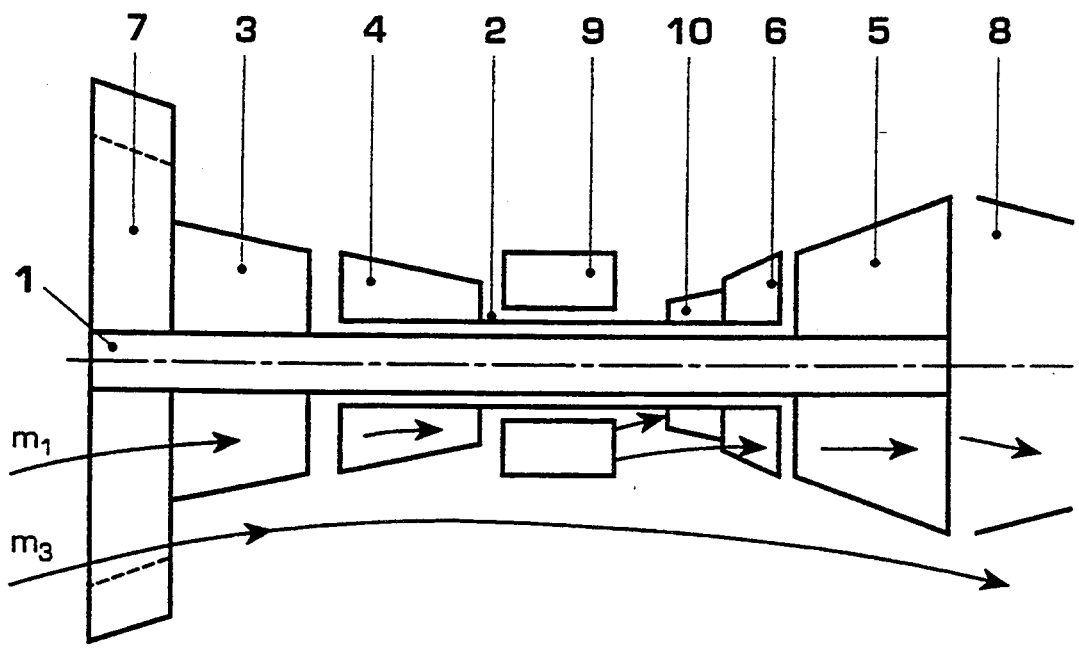
FIG. 3 is the schematic representation of an aircraft engine with fan, a dynamic pressure machine and an additional high-pressure turbine (adaptation of the pressure conditions in the turbines)

The latter also applies to the exemplary embodiment shown in FIG. 3, in which the pressure conditions are adapted in the turbines. The compressors 3, 4 are designed in the same manner as in the conventional aircraft engine in FIG. 1. The dynamic pressure machine 9 with isochoric combustion is disposed in place of the combustion chamber 11 and followed by an additional high-pressure turbine 10. The mode of operation of the dynamic pressure machine 9 is the same as described above in FIG. 2. Unlike in the example in FIG. 2, the gas is not greatly expanded in the medium-pressure turbine 6, for example from approximately 30 to approximately 14 bar, but instead to approximately 10 bar. The low-pressure turbine 5 connected to the medium-pressure turbine 6 therefore has an additional capacity that is utilized to drive a larger turbofan 7. Thus the mass flow $m_3$ is also increased here, and a greater propulsion power can be achieved with this aircraft engine.

Figure 4:
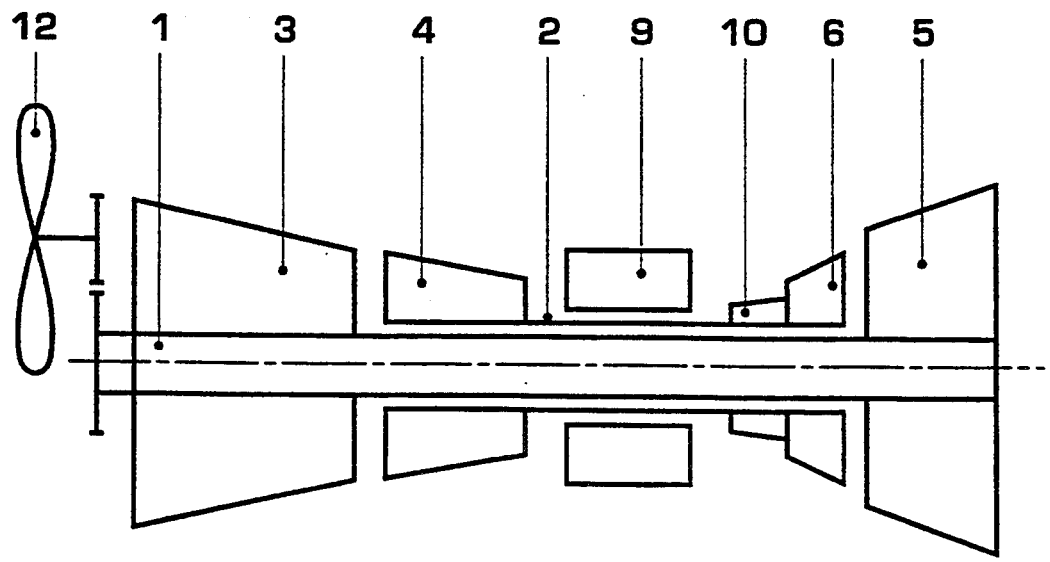
FIG. 4 is the schematic representation of an aircraft engine with propeller, a dynamic pressure machine and an additional high-pressure turbine.

In the exemplary embodiment shown in FIG. 4, the additional capacity achieved by means of the installation of the dynamic pressure machine 9 and the additional high-pressure turbine 10 is used to increase the transmission of the shaft output to the propeller 12, thus improving propulsion.

To summarize, the advantages of the invention lie in the fact that, in comparison to conventional aircraft engines, with a constant core engine either an improved efficiency and better performance are achieved, or the same performance is achieved with smaller engines.

We claim:

1. An aircraft engine with a fan drive, comprising:
a first rotatable shaft supporting at least a low pressure compressor and a low pressure turbine;
a second rotatable shaft, disposed coaxially with the first shaft and rotatable independently of the first shaft, the second shaft supporting a medium pressure compressor, a high pressure turbine and a medium-pressure turbine;
a constant volume combustion dynamic pressure machine disposed downstream of the medium pressure compressor and connected to receive compressed air from the medium pressure compressor and upstream of the high pressure turbine, the dynamic pressure machine acting as a high pressure compression stage and having a rotatable cellular wheel disposed between an air side part and a gas side part, both side parts having inlet and outlet openings, the cellular wheel having a plurality of cells and means for performing a continuous ignition and combustion process in the cells; and
means for directing combusted gas from the dynamic pressure machine to the high pressure turbine.

2. The aircraft engine as defined by claim 1, further comprising a planetary gear for driving a rotor of the dynamic pressure machine.

3. The aircraft engine as defined by claim 1, further comprising means for supporting a rotor of the dynamic pressure machine so that it free-wheels at a low rpm.

4. The aircraft engine as claimed in claim 1, further comprising means for simultaneously directing an additional flow of combusted gas from the dynamic pressure machine to the medium pressure turbine.

* * * * *